US008981034B2

(12) United States Patent
Wu et al.

(10) Patent No.: US 8,981,034 B2
(45) Date of Patent: Mar. 17, 2015

(54) METHOD FOR PREPARING POLYARYLETHERKETONE-BASED COPOLYMER BY USING QUATERNARY COPOLYMERIZATION TECHNOLOGY

(75) Inventors: Zhongwen Wu, Guangzhou (CN); Rongtang Ma, Guangzhou (CN)

(73) Assignee: Kingfa Science & Technology Co., Ltd., Guangzhou (CN)

( * ) Notice: Subject to any disclaimer, the term of this patent is extended or adjusted under 35 U.S.C. 154(b) by 101 days.

(21) Appl. No.: 13/318,195

(22) PCT Filed: Jun. 23, 2010

(86) PCT No.: PCT/CN2010/074303
§ 371 (c)(1),
(2), (4) Date: Oct. 31, 2011

(87) PCT Pub. No.: WO2010/149040
PCT Pub. Date: Dec. 29, 2010

(65) Prior Publication Data
US 2012/0095182 A1   Apr. 19, 2012

(30) Foreign Application Priority Data

Jun. 26, 2009   (CN) .......................... 2009 1 0067178

(51) Int. Cl.
C08G 8/02 (2006.01)
C08G 14/00 (2006.01)
C08G 65/40 (2006.01)

(52) U.S. Cl.
CPC ........ *C08G 65/4012* (2013.01); *C08G 65/4093* (2013.01); *C08G 2650/40* (2013.01)
USPC ......................................... 528/125; 528/126

(58) Field of Classification Search
CPC .................................................. C08G 65/4012
USPC ................................................ 528/125, 126
See application file for complete search history.

(56) References Cited

U.S. PATENT DOCUMENTS

| | | | | | |
|---|---|---|---|---|---|
| 4,056,511 | A | * | 11/1977 | Staniland | 528/125 |
| 4,176,222 | A | * | 11/1979 | Cinderey et al. | 528/126 |
| 4,638,044 | A | * | 1/1987 | Kelsey | 528/125 |
| 4,657,990 | A | * | 4/1987 | Daoust et al. | 525/471 |
| 4,731,429 | A | * | 3/1988 | McMaster et al. | 528/127 |
| 4,774,311 | A | * | 9/1988 | Kelsey | 528/125 |
| 4,806,618 | A | * | 2/1989 | Imai et al. | 528/125 |
| 4,837,296 | A | * | 6/1989 | Heinz et al. | 528/125 |
| 4,931,530 | A | * | 6/1990 | Fukawa et al. | 528/125 |
| 4,942,216 | A | * | 7/1990 | Heinz et al. | 528/125 |
| 5,053,477 | A | * | 10/1991 | Kern et al. | 528/125 |
| 5,081,214 | A | * | 1/1992 | Schneller | 528/125 |
| 5,115,076 | A | * | 5/1992 | Reuter et al. | 528/125 |
| 5,116,933 | A | * | 5/1992 | Newton | 528/125 |
| 5,130,408 | A | * | 7/1992 | Deeg | 528/125 |
| RE34,085 | E | * | 9/1992 | Rose et al. | 528/125 |
| 5,166,304 | A | * | 11/1992 | Dubal et al. | 528/125 |
| 5,194,561 | A | * | 3/1993 | Fischer et al. | 528/125 |
| 5,212,278 | A | * | 5/1993 | Pfaendner et al. | 528/171 |
| 5,290,906 | A | * | 3/1994 | Matsumura et al. | 528/125 |
| 5,298,592 | A | * | 3/1994 | Aumueller et al. | 528/126 |
| 6,103,322 | A | * | 8/2000 | Gibbons et al. | 428/1.25 |
| 8,236,919 | B2 | * | 8/2012 | Wu et al. | 528/125 |
| 2005/0010015 | A1 | * | 1/2005 | Zhang et al. | 528/125 |
| 2005/0064260 | A1 | * | 3/2005 | Otsuki et al. | 429/30 |
| 2007/0265415 | A1 | * | 11/2007 | Richter et al. | 528/125 |
| 2009/0082538 | A1 | * | 3/2009 | Wu | 528/128 |
| 2009/0149625 | A1 | * | 6/2009 | Yamakawa et al. | 528/226 |
| 2011/0172317 | A1 | * | 7/2011 | Lehmann et al. | 521/27 |
| 2011/0178237 | A1 | * | 7/2011 | Ono et al. | 524/592 |
| 2011/0201775 | A1 | * | 8/2011 | Louis et al. | 528/126 |
| 2011/0213095 | A1 | * | 9/2011 | Louis | 525/390 |
| 2011/0213115 | A1 | * | 9/2011 | Louis | 528/126 |
| 2011/0224399 | A1 | * | 9/2011 | Louis et al. | 528/126 |

FOREIGN PATENT DOCUMENTS

| | | | |
|---|---|---|---|
| CN | 1884330 | A | 12/2006 |
| CN | 1884331 | A | 12/2006 |
| CN | 101215365 | A * | 7/2008 |
| CN | 101245139 | A | 8/2008 |
| CN | 101580583 | A | 11/2009 |
| CN | 101735445 | A | 6/2010 |
| EP | 2000493 | A1 * | 12/2008 |

OTHER PUBLICATIONS

International Search Report for PCT/CN2010/074303, dated Sep. 30, 2010.

* cited by examiner

*Primary Examiner* — Liam J Heincer
(74) *Attorney, Agent, or Firm* — Pearne & Gordon LLP

(57) ABSTRACT

A method for preparing polyaryletherketone-based copolymer by using quaternary copolymerization technology comprises: (1) adding high-temperature organic solvent into a three-necked flask equipped with a thermometer, a nitrogen-feeding pipe, and a stirrer; then stirring and heating; orderly adding 4,4'-difluordiphenylketone, 4,4'-bifluorotriphenyldione, hydroquinone, and 4,4'-dihydroxydiphenylketone after the high-temperature organic solvent has been melted, and stirring to completely dissolve them; adding alkali carbonate of 1-5% excessive amount relative to total mole of hydroquinone and 4,4'-dihydroxydiphenylketone; heating to 220-230° C. while stirring, and maintaining the temperature for 20-40 minutes to complete the first salt-forming reaction, (2) heating to 250-260° C., and maintaining the temperature for 20-40 minutes to complete the second salt-forming reaction, (3) heating to 300-320° C. to start condensation polymerization, and maintaining the temperature for 3-4 hours to complete the polymerization, and (4) pouring the obtained polymer solution into distilled water at room temperature to cool to strip-shaped solid, pulverizing, extracting with ethanol to remove organic solvent, extracting with deionized water to remove byproduct salts, and vacuum-drying to obtain quaternary copolymer containing PEEK, PEEKK, PEK, and PEKEKK repeating units in molecule chains. When the mole ratio of hydroquinone to 4,4'-dihydroxydiphenylketone is above 99:1 and the mole ratio of 4,4'-difluorodiphenylketone to 4,4'-bifluorotriphenyldione is above 99:1, the obtained quaternary copolymer mainly contains PEEK chain segments, and has the same macrophysical properties as those of PEEK.

6 Claims, No Drawings

METHOD FOR PREPARING POLYARYLETHERKETONE-BASED COPOLYMER BY USING QUATERNARY COPOLYMERIZATION TECHNOLOGY

FIELD OF THE INVENTION

The invention belongs to the field of polymer materials, in particular relates to a method for preparing different varieties of poly(aryl ether ketone) copolymers using quaternary copolycondensation technology.

BACKGROUND OF THE INVENTION

Poly (aryl ether ketone) resin was formerly developed by British ICI company in the world since the 1970s and put into production in 1981. At present the commercialized products mainly include polyether-ether-ketone (PEEK) and polyether-ketone (PEK and PEEK-HT) around the world which are mainly produced by British Victrex company.

In terms of polymer condensation reaction principles, the early patents of this type of products belongs to binary homopolymerization, namely condensation polymerization of two bifunctional monomers. It was known as $A_2$, $B_2$-type homopolymerization in "statistical theory of polymeric reactions" written by the late Professor Tang Aoqing, which is one of the most simple and the most commonly used condensation polymerization reactions. Our prophase research also started from here and obtained some relevant patents, such as Chinese patent ZL 85105138.3. However, further researches found that the polycondensates having the same basic characteristics can be obtained from $A_2$, $A_2'$, $B_2$ ternary copolycondensation. Chinese patents, such as patent number: ZL200510017239.8, that we have applied and received authorization, were of this kind. After this kind of ternary copolycondensation synthetic method acquired success, in recent years we have applied a series of related patents and there were six patents have been authorized, and the rest were still in the substantive examination.

Based on completing the research and development of binary homopolymerization and ternary copolycondensation, in recent years we carried out the research and development of quaternary copolycondensation and completed the present invention.

SUMMARY OF THE INVENTION

The objective of the present invention is to provide a method for synthesizing poly(aryl ether ketone) resin using quaternary copolycondensation, which is different from previous binary homopolymerization and ternary copolycondensation methods, in order to add the following components to the reaction system in the presence of organic solvents at high temperature:

(1). hydroquinone:

$A_2$ (2). 4,4'-dihydroxybenzophenone:

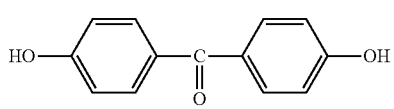

$A_2'$ (3). 4,4'-difluorobenzophenone:

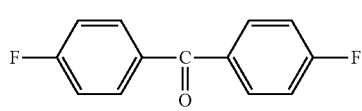

$B_2$ (4). 1,4-Bis(4-fluorobenzoyl)benzene

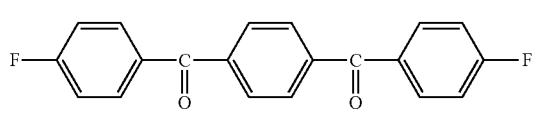

$B_2'$

Four monomers and salt forming agents, alkali metal carbonate, $M_2CO_3$ can be reacted under the control of certain temperature and time to obtain quaternary copolymers containing the following structural repeat units in the molecular chain:

Segmer I

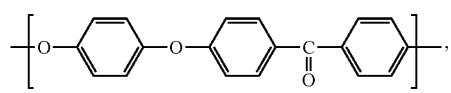

PEEK, namely $A_2B_2$

Segmer II

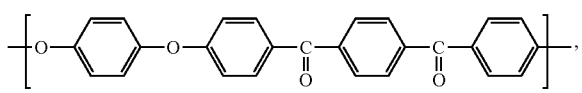

PEEKK, namely $A_2B_2'$

Segmer III

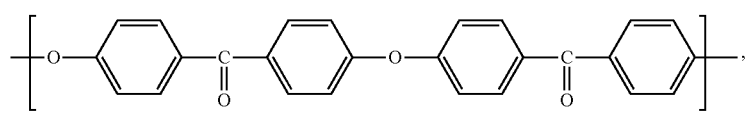

PEK, namely $A_2'B_2$

-continued

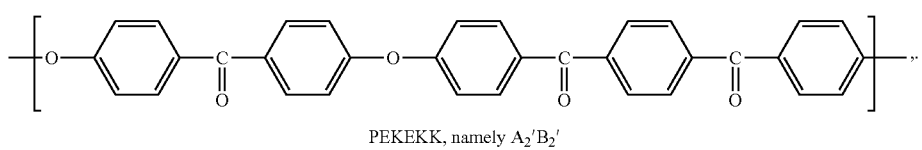

PEKEKK, namely $A_2'B_2'$

Segmer IV

The polycondensation includes the following steps: the high-temperature organic solvents, such as sulfobenzide or sulfolane, are firstly added into a three-necked bottle equipped with a thermometer, a nitrogen pipe and a stirrer, stirred and heated. After melted, the mixture is added with 4,4'-difluorobenzophenone, 1,4-Bis(4-fluorobenzoyl)benzene, hydroquinone and 4,4'-dihydroxybenzophenone, and stirred well until completely dissolved, then added with alkali metal carbonate, which is 1% to 5% more than the sum of hydroquinone and 4,4'-dihydroxybenzophenone in mole number, to the system, and heated up to 220~230° C. under stirring. The first salt-forming reaction is completed in 20 to 40 minutes under constant temperature of 220 to 230° C., then the temperature is heated up to 250 to 260° C. and the second salt-forming reaction is completed in 20 to 40 minutes under constant temperature of 250 to 260° C., followed by heated up to 300 to 320° C. for starting the polycondensation reaction, and the polymerization reaction is completed in 3 to 4 hours during this phase under the constant temperature of 300 to 320° C. The above polymer solution is poured into the distilled water at room temperature and cooled into stripy solids. The solids are crushed and extracted with ethanol to remove the solvent sulfobenzide in the polymer, and then added with vaal water to extract the by-product salts, followed by vacuum drying to obtain the quaternary copolymers containing structural repeat units PEEK, PEEKK, PEK and PEKEKK in the molecular chain.

Under given conditions, when the mole ratio of hydroquinone and 4,4'-dihydroxybenzophenone is greater than 99:1 and the mole ratio of 4,4'-difluorobenzophenone and 1,4-Bis(4-fluorobenzoyl)benzene is greater than 99:1, in the molecular chain of resulted quaternary copolymers, the structure I segment is major with equivalent macroscopic properties with PEEK, in which the mole number of hydroquinone is the same as that of 4,4'-difluorobenzophenone and the mole number of 4,4'-dihydroxybenzophenone is the same as that of 1,4-Bis(4-fluorobenzoyl)benzene;

when the mole ratio of hydroquinone and 4,4'-dihydroxybenzophenone is greater than 99:1 and the mole ratio of 1,4-Bis(4-fluorobenzoyl)benzene and 4,4'-difluorobenzophenone is greater than 99:1, in the molecular chain of resulted quaternary copolymers, the structure II segment is major with equivalent macroscopic properties with PEEKK, in which the mole number of hydroquinone is the same as that of 1,4-Bis(4-fluorobenzoyl)benzene and the mole number of 4,4'-dihydroxybenzophenone is the same as that of 4,4'-difluorobenzophenone;

when the mole ratio of 4,4'-dihydroxybenzophenone and hydroquinone is greater than 99:1 and the mole ratio of 4,4'-difluorobenzophenone and 1,4-Bis(4-fluorobenzoyl)benzene is greater than 99:1, in the molecular chain of resulted quaternary copolymers, the structure III segment is major with equivalent macroscopic properties with PEK, in which the mole number of 4,4'-dihydroxybenzophenone is the same as that of 4,4'-difluorobenzophenone and the mole number of hydroquinone is the same as that of 1,4-Bis(4-fluorobenzoyl)benzene;

when the mole ratio of 4,4'-dihydroxybenzophenone and hydroquinone is greater than 99:1 and the mole ratio of 1,4-Bis(4-fluorobenzoyl)benzene and 4,4'-difluorobenzophenone is greater than 99:1, in the molecular chain of resulted quaternary copolymers, the structure IV segment is major with equivalent macroscopic properties with PEKEKK, in which the mole number of 4,4'-dihydroxybenzophenone is the same as that of 1,4-Bis(4-fluorobenzoyl)benzene and the mole number of hydroquinone is the same as that of 4,4'-difluorobenzophenone.

The core concept of the present invention is that according to the basic principle of "statistical theory of polymer reactions" written by the late professor Tang Aoqing, in the $A_2$, $A_2'$, $B_2$, $B_2'$ quaternary copolymerization, as long as the mole ratio of the monomers is under control, the quaternary copolymers with any one of the above four structures (I-IV) as main ingredient can be prepared respectively in the same reaction device, so that the macroscopic properties of the copolymer are equivalent as the homopolymer having this kind of structure.

It is well known that as we prepare homopolymers with condensation reaction principle, we have no choice but to use the binary homopolymerization technology and there is only one kind of polymer obtained from each reaction, however, when using the ternary polymerization technology, there are two copolymers with equivalent macro properties with their corresponding homopolymers obtained through controlling the charge ratio of the three monomers. Through the quaternary copolymerization technology completed in this patent, as long as we can control the charge ratio of the four monomers, we can obtain four kinds of copolymers with the equivalent macroscopic properties with the corresponding homopolymers, respectively, namely polyether ether ketone (PEEK), polyether ketone (PEK), polyether ether ketone ketone (PEEKK) and polyether ketone ether ketone ketone (PEKEKK).

The solvents used herein can be sulfobenzide or sulfolane. The alkali metal carbonate used herein includes $K_2CO_3$, $Na_2CO_3$ or mixture of the two salts in different proportions.

DETAILED DESCRIPTION OF THE PREFERRED EMBODIMENTS

Embodiment 1

677.53 g of solvents sulfobenzide was firstly added into a three-necked bottle equipped with a thermometer, a nitrogen pipe and a stirrer, heated until completely melted, and then added in turn with 109.00 g (0.99 mol) hydroquinone, 2.14 g (0.01 mol) 4,4'-dihydroxybenzophenone, 216.01 g (0.99 mol) 4,4'-difluorobenzophenone and 3.22 g (0.01 mol) 1,4-Bis(4-fluorobenzoyl)benzene, and added with 114.00 g (1.075 mol) $Na_2CO_3$ after dissolved into homogeneous liquid. The mixture was heated up to 230° C. under stirring and reacted at constant temperature of 230° C. for 30 min, and then heated up to 250° C. and reacted at constant temperature for 30 min, and finally heated up to 310° C. and reacted at constant temperature for 3 hours to give quaternary copolymer.

After stopping stirring, the quaternary copolymer was immediately injected into distilled water at room temperature and cushed after cooled. After centrifugation, the solid powder was refluxed with ethanol, which is 10 times of quaternary copolymer in weight, to extract the solvent sulfobenzide for 1 hour, filtered and extracted with new ethanol, repeated until the content of sulfobenzide detected by the fusion index instrument was qualified (<0.5%), and then refluxed by distilled water to extract the by-product NaF, and then repeated until the content of NaF detected by fluoride ion test instrument was qualified (<1 ppm), obtaining solid granular quaternary copolymer (>95%).

The solid granular polymer was dried under vacuum to obtain quaternary copolymer with equivalent macroscopic properties as PEEK until the moisture content was less than 0.5%.

The thermal properties measured by DSC were as follows:
Tg=143° C.,
Tm=334° C.,
The mechanical properties were as follows:
Tensile strength>94 Mpa,
Bending strength>140 Mpa,
The results showed that the macroscopic properties of resulted copolymer were quite equivalent to homopolymer PEEK.

Embodiment 2

915.64 g of solvents sulfobenzide, 109.00 g (0.99 mol) hydroquinone, 2.14 g (0.01 mol) 4,4'-dihydroxybenzophenone, 2.18 g (0.01 mol) 4,4'-difluorobenzophenone, 319.10 g (0.99 mol) 1,4-Bis(4-fluorobenzoyl)benzene and 114.00 g (1.075 mol) $Na_2CO_3$ were added into the same reactor as the embodiment 1 with the same sequence and operations. Other steps were completely operated as embodiment 1 to obtain the quaternary copolymer with quite equivalent macroscopic properties as PEEKK.

The thermal properties measured by DSC were as follows:
Tg=156° C.
Tm=367° C.
The mechanical properties were as follows:
Tensile strength>98 Mpa,
Bending strength>150 Mpa,
The results showed that the macroscopic properties of resulted copolymer were quite equivalent to homopolymer PEEKK.

Embodiment 3

915.62 g of solvents sulfobenzide, 1.10 g (0.01 mol) hydroquinone, 212.07 g (0.99 mol) 4,4'-dihydroxybenzophenone, 216.02 g (0.99 mol) 4,4'-difluorobenzophenone, 3.22 g (0.01 mol) 1,4-Bis(4-fluorobenzoyl)benzene and 114.00 g (1.075 mol) $Na_2CO_3$ were added into the same reactor as the embodiment 1 with the same sequence and operations. Other steps were completely operated as embodiment 1 to obtain the quaternary copolymer with quite equivalent macroscopic properties as PEK.

The thermal properties measured by DSC were as follows:
Tg=157° C.
Tm=373° C.
The mechanical properties were as follows:
Tensile strength>100 Mpa,
Bending strength>160 Mpa,
The results showed that the macroscopic properties of resulted copolymer were quite equivalent to homopolymer PEK.

Embodiment 4

1146.32 g of solvents sulfobenzide, 1.10 g (0.01 mol) hydroquinone, 109.00 g (0.99 mol) 4,4'-dihydroxybenzophenone, 2.18 g (0.01 mol) 4,4'-difluorobenzophenone, 319.10 g (0.99 mol) 1,4-Bis(4-fluorobenzoyl)benzene and 95.40 g, 103.35 g (0.975 mol) of $Na_2CO_3$ and 13.82 g (0.1 mol) $K_2CO_3$ were added into the same reactor as the embodiment 1 with the same sequence and operations. Other steps were completely operated as embodiment 1 to obtain the quaternary copolymer with quite equivalent macroscopic properties as PEKEKK.

The thermal properties measured by DSC were as follows:
Tg=171° C.
Tm=381° C.
The mechanical properties were as follows:
Tensile strength>102 Mpa,
Bending strength>165 Mpa,
The results showed that the macroscopic properties of resulted copolymer were quite equivalent to homopolymer PEKEKK.

The invention claimed is:

1. A method for preparing poly(aryl ether ketone) copolymers using quaternary copolycondensation technology, including the following steps: sulfolane is first added into a three-necked bottle equipped with a thermometer, a nitrogen pipe and a stirrer, stirred and heated, after melted the mixture is added in turn with four monomers, 4,4'-difluorobenzophenone, 1,4-bis(4-fluorobenzyl)benzene, hydroquinone and 4,4'-dihydroxybenzophenone, and stirred well until completely dissolved, then added with alkali metal carbonate, which is 1% to 5% more than the sum of hydroquinone and 4,4'-dihydroxybenzophenone in mole number, to the system, and heated up to a temperature of 200 to 230° C. under stirring to complete the first salt-forming reaction by reacting 20 to 40 minutes under constant temperature of 220 to 230° C.; then the temperature is heated up to 250 to 260° C. and the second salt-forming reaction is completed in 20 to 40 minutes under constant temperature of 250 to 260° C., followed by heated up to 300 to 320° C. for starting the polycondensation reaction, and the polymerization reaction is completed in 3 to 4 hours during this phase under the constant temperature of 300 to 320° C.; finally, the above polymer solution is poured into the distilled water at room temperature and cooled into stripy solids, and the solids are crushed and extracted with ethanol to remove the solvent sulfobenzide or sulfolane in the polymer, and then added with deionized water to extract the by-product salts, followed by vacuum drying, wherein the charge ratio of the four monomers is controlled to obtain one of four quaternary copolymers, wherein each one of the four quaternary copolymers contains-structural repeat units PEEK, PEEKK, PEK and PEKEKK in the molecular chain, with one of the repeat units constituting major part of the copolymer obtained and the remaining three of the repeat units constituting minor part of the copolymer obtained, such that the copolymer obtained has equivalent macroscopic properties with a corresponding homopolymer that is constituted solely by the one of the repeat units constituting the major part of the copolymer obtained.

2. The method according to claim 1, characterized in that the alkali metal carbonates are $K_2CO_3$, $Na_2CO_3$, or their mixture in different proportions.

3. The method according to claim 1, characterized in that the mole ratio of hydroquinone and 4,4'-dihydroxybenzophenone is greater than 99:1 and the mole ratio of 4,4'-difluorobenzophenone and 1,4-bis(4-fluorobenzyl)benzene is greater than 99:1, the resulted quaternary copolymers contains the PEEK segment as the major component in its molecular chain and has equivalent macroscopic properties with PEEK, in which the mole number of hydroquinone is the same as that of 4,4'-difluorobenzophenone and the mole number of 4,4'-dihydroxybenzophenone is the same as that of 1,4-bis(4-fluorobenzyl)benzene.

4. The method according to claim 1, characterized in that the mole ratio of hydroquinone and 4,4'-dihydroxybenzophenone is greater than 99:1 and the mole ratio of 1,4-bis(4-fluorobenzyl)benzene and 4,4'-difluorobenzophenone is greater than 99:1, the resulted quaternary copolymers contains the PEEKK segment as the major component in its molecular chain and has equivalent macroscopic properties with PEEKK, in which the mole number of hydroquinone is the same as that of 1,4-bis(4-fluorobenzyl)benzene and the mole number of 4,4'-dihydroxybenzophenone is the same as that of 4,4'-difluorobenzophenone.

5. The method according to claim 1, characterized in that when the mole ratio of 4,4'-dihydroxybenzophenone and hydroquinone is greater than 99:1 and the mole ratio of 4,4'-difluorobenzophenone and 1,4-bis(4-fluorobenzyl)benzene is greater than 99:1, the resulted quaternary copolymers contains the PEK segment as the major component in its molecular chain and has equivalent macroscopic properties with PEK, in which the mole number of 4,4'-dihydroxybenzophenone is the same as that of 4,4'-difluorobenzophenone and the mole number of hydroquinone is the same as that of 1,4-bis(4-fluorobenzyl)benzene.

6. The method according to claim 1, characterized in that when the mole ratio of 4,4'-dihydroxybenzophenone and hydroquinone is greater than 99:1 and the mole ratio of 1,4-bis(4-fluorobenzyl)benzene and 4,4'-difluorobenzophenone is greater than 99:1, the resulted quaternary copolymers contains the PEKEKK segment as the major component in its molecular chain and has equivalent macroscopic properties with PEKEKK, in which the mole number of 4,4'-dihydroxybenzophenone is the same as that of 1,4-bis(4-fluorobenzyl)benzene and the mole number of hydroquinone is the same as that of 4,4'-difluorobenzophenone.

\* \* \* \* \*

UNITED STATES PATENT AND TRADEMARK OFFICE
CERTIFICATE OF CORRECTION

PATENT NO. : 8,981,034 B2
APPLICATION NO. : 13/318195
DATED : March 17, 2015
INVENTOR(S) : Zhongwen Wu and Rongtang Ma It is certified that error appears in the above-identified patent and that said Letters Patent is hereby corrected as shown below:

In the claims,

Claim number 1, col. 6, line 51, the text "sulfobenzide or" should be removed.

Signed and Sealed this
Twenty-fifth Day of August, 2015

Michelle K. Lee
*Director of the United States Patent and Trademark Office*